US012379016B2

(12) United States Patent
Ioku et al.

(10) Patent No.: US 12,379,016 B2
(45) Date of Patent: Aug. 5, 2025

(54) UTILITY VEHICLE AND TRANSMISSION

(71) Applicant: KAWASAKI MOTORS, LTD., Hyogo (JP)

(72) Inventors: Yasuyuki Ioku, Akashi (JP); Kazuho Matsumoto, Akashi (JP); Yuji Hida, Akashi (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 0 days.

(21) Appl. No.: 18/215,927

(22) Filed: Jun. 29, 2023

(65) Prior Publication Data

US 2025/0003466 A1 Jan. 2, 2025

(51) Int. Cl.
*F16H 3/00* (2006.01)
*F16H 61/688* (2006.01)

(52) U.S. Cl.
CPC ............ *F16H 3/006* (2013.01); *F16H 61/688* (2013.01)

(58) Field of Classification Search
CPC .... F16H 3/10; F16H 2200/0052; F16H 3/006; F16H 61/688
See application file for complete search history.

(56) References Cited

U.S. PATENT DOCUMENTS 9,611,934 B2 * 4/2017 Eto ..................... F16H 61/0403
10,040,346 B2 * 8/2018 Rode ................... B60K 17/344
10,112,481 B2 * 10/2018 Kowalsky ............ B60K 17/344
2011/0167955 A1 * 7/2011 Pritchard ................ F16H 3/006
74/665 A
2022/0388387 A1 12/2022 Matsuda

FOREIGN PATENT DOCUMENTS

JP 2010179859 A * 8/2010
KR 20160035663 A * 4/2016

OTHER PUBLICATIONS

English Translation of JP2010179859 (Year: 2010).*
English Translation of KR20160035663 (Year: 2016).*

* cited by examiner

*Primary Examiner* — Victor L MacArthur
(74) *Attorney, Agent, or Firm* — Wenderoth, Lind & Ponack, L.L.P.

(57) ABSTRACT

A utility vehicle including a transmission, the transmission including: at least one input shaft to which power from a drive source is input; an output shaft that outputs the power from the drive source to a drive wheel; a plurality of gear-position gear trains each including a drive gear provided on the input shaft and a driven gear provided on the output shaft; and an engaging clutch that brings a gear-position gear train into a power transmittable state. A one-way clutch that transmits rotation only in a direction from the drive source toward the drive wheel is disposed in a predetermined gear-position gear train having a maximum reduction ratio among the plurality of gear-position gear trains including the drive gears provided on the same input shaft.

11 Claims, 8 Drawing Sheets

UTILITY VEHICLE AND TRANSMISSION

BACKGROUND OF THE INVENTION

Technical Field

The present disclosure relates to a utility vehicle and a transmission.

Related Art

A utility vehicle may include a dual clutch transmission as described in US 2022/0388387 A1. A dual clutch transmission includes two clutches, and is configured to perform shifting by alternately switching between an odd gear position and an even gear position.

In a transmission mounted on a utility vehicle, when the number of gear positions increases along with multistage, the number of engaging clutches increases, which may cause an increase in cost and an increase in size of the transmission.

SUMMARY OF THE INVENTION

An object of the present disclosure is to reduce the number of engaging clutches in a transmission of a utility vehicle.

In order to achieve the above object, the present disclosure provides a utility vehicle including a transmission, the transmission including: at least one input shaft to which power from a drive source is input; an output shaft that outputs the power from the drive source to a drive wheel; a plurality of gear-position gear trains each including a drive gear provided on the input shaft and a driven gear provided on the output shaft; and an engaging clutch that brings a gear-position gear train into a power transmittable state, in which a one-way clutch that transmits rotation only in a direction from the drive source toward the drive wheel is disposed in a predetermined gear-position gear train having a maximum reduction ratio among the plurality of gear-position gear trains including the drive gears provided on the same input shaft.

According to the present disclosure, in the utility vehicle, the predetermined gear-position gear train having the maximum reduction ratio among the plurality of gear-position gear trains provided on the same input shaft can be brought into the power transmittable state from the drive source to the drive wheel by the one-way clutch. As a result, it is not necessary to use the engaging clutch to bring the predetermined gear-position gear train into the power transmission state as compared with the case of using the plurality of engaging clutches to bring the plurality of gear-position gear trains into the power transmittable state, so that the number of engaging clutches can be reduced. When the gear-position gear train other than the predetermined gear-position gear train having the maximum reduction ratio is brought into the power transmittable state, the one-way clutch is idled, so that the power transmittable state of the other gear-position gear train can be realized. Therefore, it is possible to realize multistage while suppressing the number of the engaging clutches. It is possible to enhance the traveling performance by preparing a low gear position having a large reduction ratio along with multistage.

The present disclosure also provides a transmission including: at least one input shaft to which power from a drive source is input; an output shaft that outputs the power from the drive source to a drive wheel; a plurality of gear-position gear trains each including a drive gear provided on the input shaft and a driven gear provided on the output shaft; and an engaging clutch that brings a gear-position gear train into a power transmittable state, in which a one-way clutch that transmits rotation only in a direction from the drive source toward the drive wheel is disposed in a predetermined gear-position gear train having a maximum reduction ratio among the plurality of gear-position gear trains including the drive gears provided on the same input shaft.

According to the present disclosure, in the transmission, the predetermined gear-position gear train having the maximum reduction ratio among the plurality of gear-position gear trains provided on the same input shaft can be brought into the power transmittable state from the drive source to the drive wheel by the one-way clutch. As a result, it is not necessary to use the engaging clutch to bring the predetermined gear-position gear train into the power transmission state as compared with the case of using the plurality of engaging clutches to bring the plurality of gear-position gear trains into the power transmittable state, so that the number of engaging clutches can be reduced. When the gear-position gear train other than the predetermined gear-position gear train having the maximum reduction ratio is brought into the power transmittable state, the one-way clutch is idled, so that the power transmittable state of the other gear-position gear train can be realized. Therefore, it is possible to realize multistage while suppressing the number of the engaging clutches.

BRIEF DESCRIPTION OF THE DRAWINGS

The foregoing and the other features of the present disclosure will become apparent from the following description and drawings of an illustrative embodiment of the disclosure in which.

DETAILED DESCRIPTION OF EMBODIMENTS

Hereinafter, a utility vehicle according to an embodiment of the present disclosure will be described with reference to the accompanying drawings. The utility vehicle is mainly a vehicle for traveling not only on grasslands, gravel, and sand, but also on an off road such as unpaved mountain roads, forest roads, muddy areas, and rocky areas. In the present specification, "front", "rear", "left", and "right" refer to a front direction, a rear direction, a left direction, and a right direction as seen from a driver in the utility vehicle.

Figure 1:
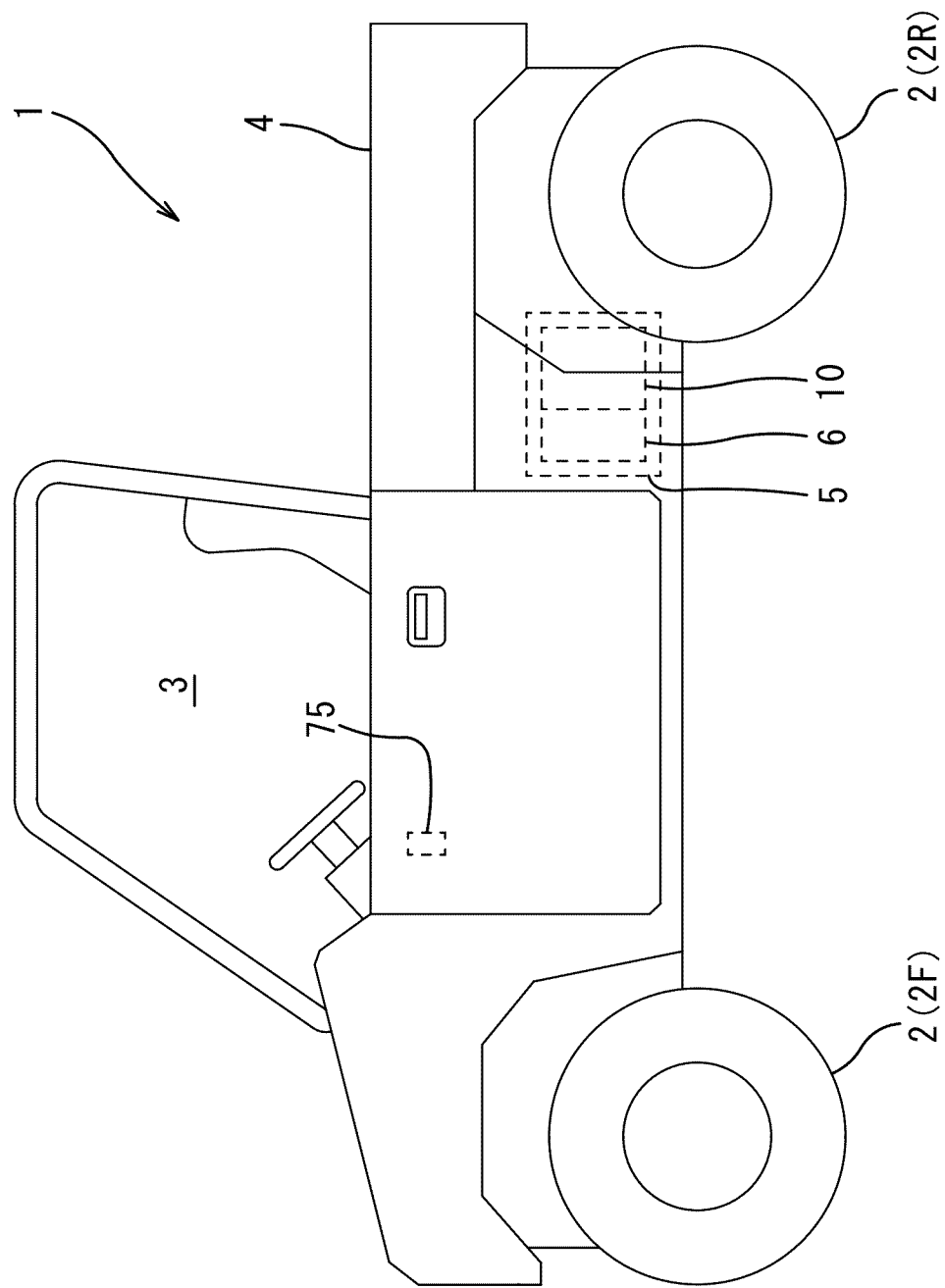
FIG. 1 is a schematic side view of a utility vehicle.

FIG. 1 is a schematic side view of a utility vehicle. As illustrated in FIG. 1, a utility vehicle 1 includes wheels 2 including left and right front wheels 2F and left and right rear wheels 2R, and a riding space (vehicle interior) 3 in which a passenger including a driver boards is provided between the front wheels 2F and the rear wheels 2R.

The riding space 3 is surrounded by a ROPS. The ROPS is an abbreviation for rollover protection structure and is a part of a vehicle body frame. A seat is disposed in the riding space 3, and a steering wheel or the like is provided in front of the seat.

A cargo bed 4 is provided behind the riding space 3, and a power unit 5 is disposed below the cargo bed 4. The power unit 5 includes a drive source 6 and a transmission 10. The drive source 6 generates power for rotating the wheels 2. The power from the drive source 6 is transmitted to the wheels 2 via the transmission 10. An engine is used as the drive source 6. The drive source may include an electric motor in addition to the engine.

Figure 2:
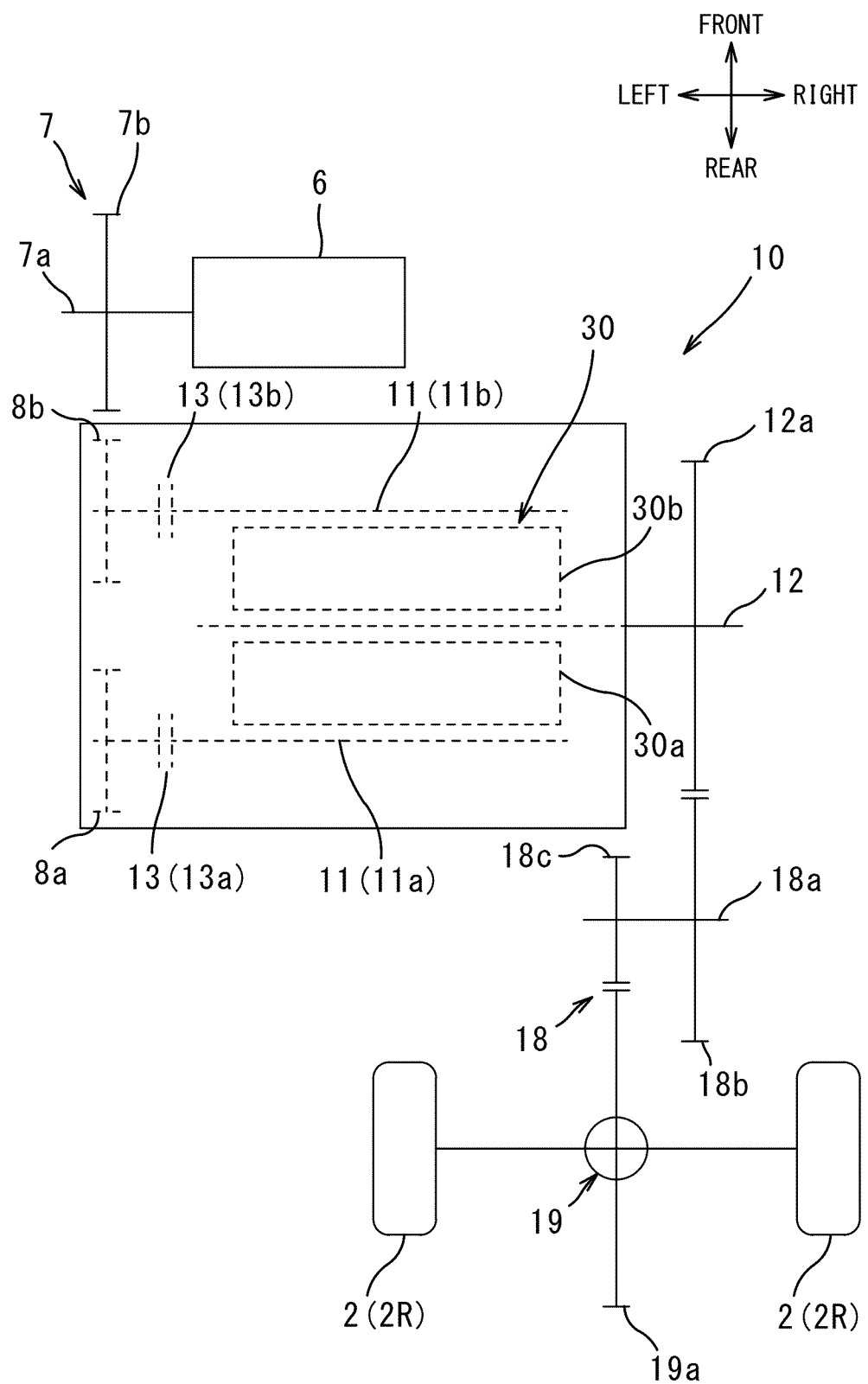
FIG. 2 is a schematic configuration diagram of the utility vehicle.

FIG. 2 is a schematic configuration diagram of the utility vehicle. As illustrated in FIG. 2, the transmission 10 is disposed on a power transmission path from the drive source 6 to the wheels 2 which are drive wheels, and is configured to shift an output power generated by the drive source 6. The transmission 10 includes at least one input shaft 11 to which power from the drive source 6 is input, an output shaft 12 that is disposed in parallel with the input shaft 11 and outputs the power from the drive source 6 input to the input shaft 11 to the wheels 2, a friction clutch 13 that connects and disconnects the power from the drive source 6 input to the input shaft 11, and a plurality of gear-position gear trains 30 provided between the input shaft 11 and the output shaft 12.

The transmission 10 is a dual clutch transmission (DCT). The input shaft 11 includes a first input shaft 11a and a second input shaft 11b as at least one input shaft. The output shaft 12 is disposed parallel to the first input shaft 11a and the second input shaft 11b. The friction clutch 13 includes a first friction clutch 13a and a second friction clutch 13b that connect and disconnect power from the drive source 6 input to the first input shaft 11a and the second input shaft 11b, respectively. The plurality of gear-position gear trains 30 include a plurality of gear-position first input shaft gear trains 30a and a plurality of gear-position second input shaft gear trains 30b provided between the first input shaft 11a and the output shaft 12 and between the second input shaft 11b and the output shaft 12, respectively.

The power from the drive source 6 is input to the transmission 10 via a primary reduction mechanism 7. The primary reduction mechanism 7 includes an output drive gear 7b fixed to an output shaft 7a of the drive source 6, and a first input gear 8a and a second input gear 8b that are respectively disposed on the axes of the first input shaft 11a and the second input shaft 11b and mesh with the output drive gear 7b. The primary reduction mechanism 7 decelerates and transmits the rotation of the output shaft 7a of the drive source 6 to the first input gear 8a and the second input gear 8b. The output drive gear 7b may mesh with the first input gear 8a and the second input gear 8b via an intermediate gear.

The transmission 10 shifts the power from the drive source 6 input to the first input shaft 11a and the second input shaft 11b via the gear-position first gear train 30a and the gear-position second gear train 30b, respectively, and outputs the power from the output shaft 12 to the drive wheels 2. The rotation of the output gear 12a fixed to the output shaft 12 is transmitted to an input gear 19a of a differential device 19 via a final reduction mechanism 18, and is transmitted to the left and right wheels 2.

The final reduction mechanism 18 includes a counter shaft 18a, an input gear 18b that meshes with the output gear 12a, and an output gear 18c that meshes with the input gear 19a of the differential device 19, and reduces power from the drive source 6. A two-wheel drive four-wheel drive switching device (not illustrated) is attached to the counter shaft 18a. The two-wheel drive four-wheel drive switching device is configured to switch between a two-wheel drive state in which only the rear wheels 2R are driven and a four-wheel drive state in which the rear wheels 2R and the front wheels 2F are driven.

Figure 3:
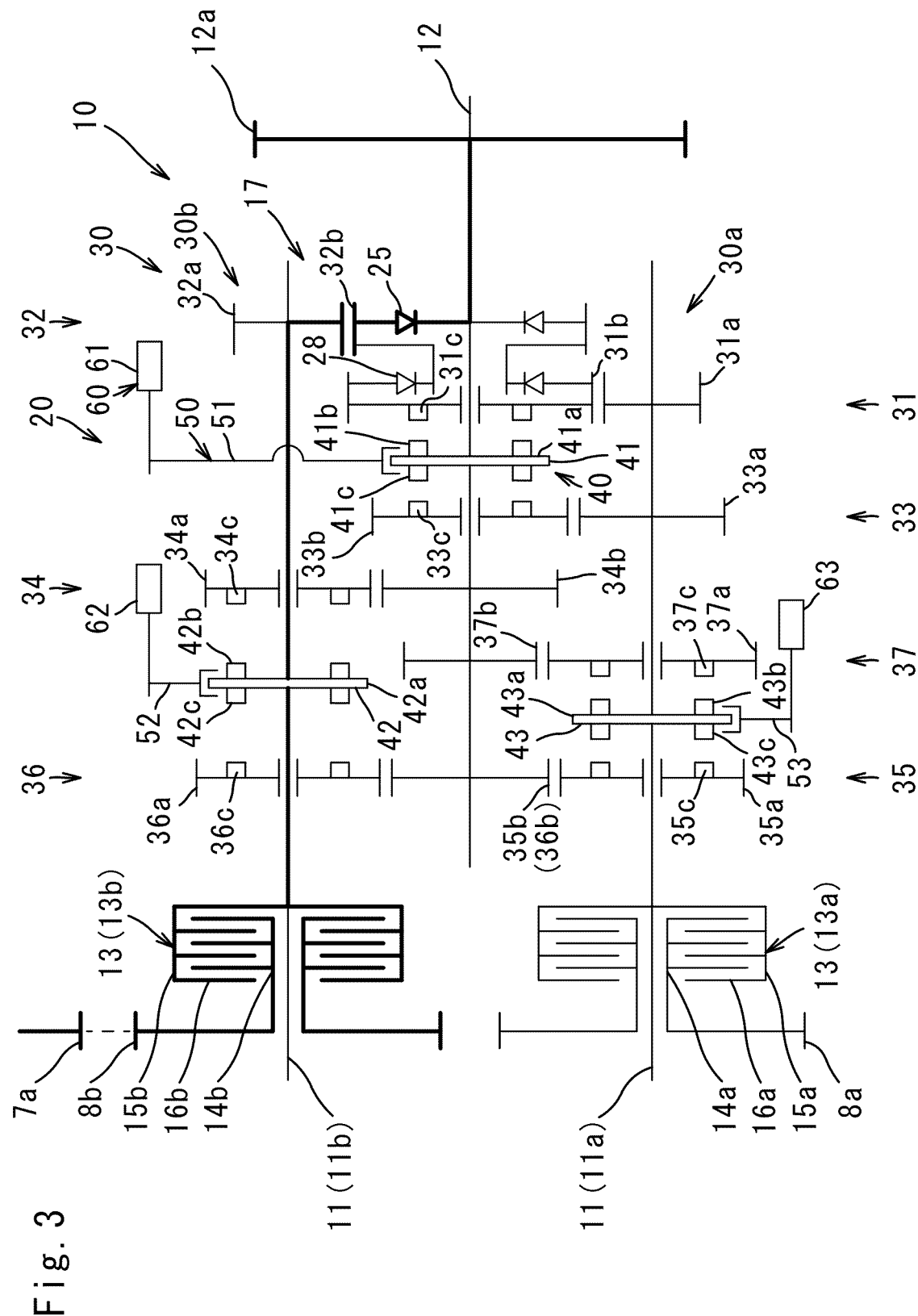
FIG. 3 is a schematic configuration diagram of a transmission.

FIG. 3 is a schematic configuration diagram of the transmission. As illustrated in FIG. 3, the transmission 10 includes a first input shaft 11a and a second input shaft 11b, an output shaft 12, a first friction clutch 13a and a second friction clutch 13b, a gear-position first input shaft gear train 30a, and a gear-position second input shaft gear train 30b. The gear-position first gear train 30a and the gear-position second gear train 30b are provided between the first input shaft 11a and the output shaft 12 and between the second input shaft 11b and the output shaft 12, respectively. The input shaft 11 and the output shaft 12 are rotatably supported by a transmission case via bearings.

As the first friction clutch 13a and the second friction clutch 13b, a wet multi-plate hydraulic clutch is used. The first friction clutch 13a includes an input rotary member 14a, an output rotary member 15a, a plurality of friction plates 16a disposed between the input rotary member 14a and the output rotary member 15a, a piston (not illustrated) that fastens the plurality of friction plates 16a, a hydraulic chamber (not illustrated) to which hydraulic pressure for biasing the piston in a fastening direction of the friction plates 16a is supplied, and a return spring (not illustrated) that biases the piston in a releasing direction of the friction plates 16a.

The first friction clutch 13a is fastened when hydraulic pressure is supplied to the hydraulic chamber, and is released when the hydraulic pressure is discharged from the hydraulic chamber. The input rotary member 14a is fixed to the first input gear 8a and is rotated together with the first input gear 8a. The output rotary member 15a is fixed to the first input shaft 11a and is rotated together with the first input shaft 11a.

The second friction clutch 13b includes an input rotary member 14b, an output rotary member 15b, a plurality of friction plates 16b disposed between the input rotary member 14b and the output rotary member 15b, a piston (not illustrated) that fastens the plurality of friction plates 16b, a hydraulic chamber (not illustrated) to which hydraulic pressure for biasing the piston in a fastening direction of the friction plates 16b is supplied, and a return spring (not illustrated) that biases the piston in a releasing direction of the friction plates 16b.

The second friction clutch 13b is fastened when hydraulic pressure is supplied to the hydraulic chamber, and is released when hydraulic pressure is discharged from the hydraulic chamber. The input rotary member 14b is fixed to the second input gear 8b and is rotated together with the second input gear 8b. The output rotary member 15b is fixed to the second input shaft 11b and is rotated together with the second input gear 8b.

The transmission 10 is configured to achieve a forward seventh gear position. The transmission 10 includes a transmission mechanism 17 that changes (decelerates) the power from the drive source 6 input to each of the first input shaft 11a and the second input shaft 11b and outputs the power to the output shaft 12. The transmission mechanism 17 includes seven gear-position gear trains.

Between the first input shaft 11a and the output shaft 12, there are provided the gear-position first input shaft gear trains 30a that are odd gear-position gear trains including a first gear-position first input shaft gear train 31, a third gear-position first input shaft gear train 33, a fifth gear-position first input shaft gear train 35, and a seventh gear-position first input shaft gear train 37. Between the second input shaft 11*b* and the output shaft 12, there are provided the gear-position second input shaft gear trains 30*b* that are even gear-position gear trains including a second gear-position second input shaft gear train 32, a fourth gear-position second input shaft gear train 34, and a sixth gear-position second input shaft gear train 36.

The first gear-position gear train 31 includes a first-gear drive gear 31*a* fixed to the first input shaft 11*a* and a first-gear driven gear 31*b* rotatably supported by the output shaft 12 and meshed with the first-gear drive gear 31*a*. The third gear-position gear train 33 includes a third-gear drive gear 33*a* fixed to the first input shaft 11*a* and a third-gear driven gear 33*b* rotatably supported by the output shaft 12 and meshed with the third-gear drive gear 33*a*. The fifth gear-position gear train 35 includes a fifth-gear drive gear 35*a* rotatably supported by the first input shaft 11*a* and a fifth-gear driven gear 35*b* fixed to the output shaft 12 and meshed with the fifth-gear drive gear 35*a*. The seventh gear-position gear train 37 includes a seventh-gear drive gear 37*a* rotatably supported by the first input shaft 11*a* and a seventh-gear driven gear 37*b* fixed to the output shaft 12 and meshed with the seventh-gear drive gear 37*a*.

The second gear-position gear train 32 includes a second-gear drive gear 32*a* fixed to the second input shaft 11*b*, and a second-gear driven gear 32*b* that includes a one-way clutch 25, is fixed to the output shaft 12 and meshed with the second-gear drive gear 32*a*. The fourth gear-position gear train 34 includes a fourth-gear drive gear 34*a* rotatably supported by the second input shaft 11*b* and a fourth-gear driven gear 34*b* fixed to the output shaft 12 and meshed with the fourth-gear drive gear 34*a*. The sixth gear-position gear train 36 includes a sixth-gear drive gear 36*a* rotatably supported by the second input shaft 11*b* and a sixth-gear driven gear 36*b* fixed to the output shaft 12 and meshed with the sixth-gear drive gear 36*a*. The sixth-gear driven gear 36*b* is also used as the fifth-gear driven gear 35*b*.

The first to seventh-gear drive gears 31*a* to 37*a* are formed to have larger gear diameters as the gear position increases. The first-gear driven gear 31*b*, the second-gear driven gear 32*b*, the third-gear driven gear 33*b*, the fourth-gear driven gear 34*b*, the fifth-gear driven gear 35*b* (sixth-gear driven gear 36*b*), and the seventh-gear driven gear 37*b* are formed to have larger gear diameters as the gear position decreases. In the first to seventh-gear position gear trains 31 to 37, the reduction ratio is set to be smaller as the gear position becomes larger. The reduction ratio is a ratio of the rotation speed of the input shaft 11 to the rotation speed of the output shaft 12.

The first-gear driven gear 31*b* and the third-gear driven gear 33*b* are supported on the output shaft 12 by bearings so as to be relatively rotatable, and are held by a holder such as a snap ring so as not to be displaced in the axial direction of the output shaft 12. The fifth-gear drive gear 35*a* and the seventh-gear drive gear 37*a* are supported by the first input shaft 11*a* so as to be relatively rotatable, and are held so as not to be displaced in the axial direction of the output shaft 12. The fourth-gear drive gear 34*a* and the sixth-gear drive gear 36*a* are supported by the second input shaft 11*b* so as to be relatively rotatable and are held so as not to be displaced in the axial direction of the output shaft 12.

The transmission 10 includes a transmission switching mechanism 20 that switches the transmission mechanism 17. The transmission switching mechanism 20 includes an engaging clutch (dog clutch) 40 that brings the gear-position gear trains 31 and 33 to 37 into a power transmittable state, a shift fork 50 that moves the engaging clutch 40, a hydraulic actuator 60 that moves the shift fork 50, and a controller 71 (see FIG. 6) that controls hydraulic pressure supplied to the hydraulic actuator 60. The second gear-position gear train 32 is brought into a power transmittable state by the one-way clutch 25 that transmits rotation only in a direction from the drive source 6 toward the drive wheel 2.

The engaging clutch 40 includes a first engaging clutch 41 disposed between the first-gear driven gear 31*b* and the third-gear driven gear 33*b*, a second engaging clutch 42 disposed between the fourth-gear drive gear 34*a* and the sixth-gear drive gear 36*a*, and a third engaging clutch 43 disposed between the seventh-gear drive gear 37*a* and the fifth-gear drive gear 35*a*. The first engaging clutch 41 is a first-gear and third-gear engaging clutch. The second engaging clutch 42 is a fourth-gear and sixth-gear engaging clutch. The third engaging clutch 43 is a fifth-gear and seventh-gear engaging clutch.

The first engaging clutch 41 includes a first dog ring 41*a* connected to the output shaft 12 so as to be relatively non-rotatable and relatively movable in the axial direction. The first dog ring 41*a* has a plurality of clutch teeth (dog teeth) 41*b* protruding toward the first-gear driven gear and a plurality of clutch teeth 41*c* protruding toward the third-gear driven gear. The first-gear driven gear 31*b* has a plurality of clutch teeth 31*c* protruding toward the first dog ring. The third-gear driven gear 33*b* has a plurality of clutch teeth 33*c* protruding toward the first dog ring.

When the clutch teeth 31*c* and 41*b* of the first-gear driven gear 31*b* and the first dog ring 41*a* are engaged with each other, the rotation of the first input shaft 11*a* is shifted via the first gear-position gear train 31 to be in a state where power can be transmitted to the output shaft 12. When the clutch teeth 33*c* and 41*c* of the third-gear driven gear 33*b* and the first dog ring 41*a* are engaged with each other, the rotation of the first input shaft 11*a* is shifted via the third gear-position gear train 33 to be in a state where power can be transmitted to the output shaft 12. The first dog ring 41*a* is switched between a first-gear engagement position and a third-gear engagement position where the first dog ring 41*a* engages with the first-gear driven gear 31*b* and the third-gear driven gear 33*b*, respectively, and a neutral position away from the first-gear driven gear 31*b* and the third-gear driven gear 33*b*.

The second engaging clutch 42 includes a second dog ring 42*a* connected to the second input shaft 11*b* so as to be relatively non-rotatable and relatively movable in the axial direction. The second dog ring 42*a* has a plurality of clutch teeth 42*b* protruding toward the fourth-gear drive gear and a plurality of clutch teeth 42*c* protruding toward the sixth-gear drive gear. The fourth-gear drive gear 34*a* has a plurality of clutch teeth 34*c* protruding toward the second dog ring. The sixth-gear drive gear 36*a* has a plurality of clutch teeth 36*c* protruding toward the second dog ring.

When the clutch teeth 34*c* and 42*b* of the fourth-gear drive gear 34*a* and the second dog ring 42*a* are engaged with each other, the rotation of the second input shaft 11*b* is shifted via the fourth gear-position gear train 34 to be in a state where power can be transmitted to the output shaft 12. When the clutch teeth 36*c* and 42*c* of the sixth-gear drive gear 36*a* and the second dog ring 42*a* are engaged with each other, the rotation of the second input shaft 11*b* is shifted via the sixth gear-position gear train 36 to be in a state where power can be transmitted to the output shaft 12. The second dog ring 42*a* is switched between a fourth-gear engagement position and a sixth-gear engagement position where the second dog ring 42a engages with the fourth-gear drive gear 34a and the sixth-gear drive gear 36a, respectively, and a neutral position away from the fourth-gear drive gear 34a and the sixth-gear drive gear 36a.

The third engaging clutch 43 includes a third dog ring 43a connected to the first input shaft 11a so as to be relatively non-rotatable and relatively movable in the axial direction. The third dog ring 43a has a plurality of clutch teeth 43b protruding toward the seventh-gear drive gear and a plurality of clutch teeth 43c protruding toward the fifth-gear drive gear. The seventh-gear drive gear 37a has a plurality of clutch teeth 37c protruding toward the third dog ring. The fifth-gear drive gear 35a has a plurality of clutch teeth 35c protruding toward the third dog ring.

When the clutch teeth 37c and 43b of the seventh-gear drive gear 37a and the third dog ring 43a are engaged with each other, the rotation of the first input shaft 11a is shifted via the seventh gear-position gear train 37 to be in a state where power can be transmitted to the output shaft 12. When the clutch teeth 35c and 43c of the fifth-gear drive gear 35a and the third dog ring 43a are engaged with each other, the rotation of the first input shaft 11a is shifted via the fifth gear-position gear train 35 to be in a state where power can be transmitted to the output shaft 12. The third dog ring 43a is switched between a seventh-gear engagement position and a fifth-gear engagement position where the third dog ring 43a engages with the seventh-gear drive gear 37a and the fifth-gear drive gear 35a, respectively, and a neutral position away from the seventh-gear drive gear 37a and the fifth-gear drive gear 35a.

In the first gear position, the first engaging clutch 41 is disposed at the first-gear engagement position, the third engaging clutch 43 is disposed at the neutral position, and the first friction clutch 13a is fastened. In the second gear position, the first and second engaging clutches 41 and 42 are disposed at the neutral position, and the second friction clutch 13b is fastened. In the third gear position, the first engaging clutch 41 is disposed at the third-gear engagement position, the third engaging clutch 43 is disposed at the neutral position, and the first friction clutch 13a is fastened. In the fourth gear position, the second engaging clutch 42 is disposed at the fourth-gear engagement position, the first engaging clutch 41 is disposed at the neutral position, and the second friction clutch 13b is fastened. In the fifth gear position, the third engaging clutch 43 is disposed at the fifth-gear engagement position, the first engaging clutch 41 is disposed at the neutral position, and the first friction clutch 13a is fastened. In the sixth gear position, the second engaging clutch 42 is disposed at the sixth-gear engagement position, the first engaging clutch 41 is disposed at the neutral position, and the second friction clutch 13b is fastened. In the seventh gear position, the third engaging clutch 43 is disposed at the seventh-gear engagement position, the first engaging clutch 41 is disposed at the neutral position, and the first friction clutch 13a is fastened.

The utility vehicle 1 includes a mode selector 75 (see FIG. 6) such as a mode selection lever which is operated by a driver to select a forward low-speed mode and a forward high-speed mode as traveling modes. In the forward low-speed mode, the first gear-position gear train 31 and the second gear-position gear train 32 are brought into a power transmittable state, and in the forward high-speed mode, the odd gear-position first input shaft gear trains 30a and the even gear-position second input shaft gear trains 30b having consecutive gear positions among the second gear-position gear train 32 to the seventh gear-position gear train 37 are brought into a power transmittable state. For example, the second gear-position gear train 32 and the third gear-position gear train 33, or the third gear-position gear train 33 and the fourth gear-position gear train 34 can transmit power.

In the utility vehicle 1, the forward high-speed mode is selected during normal traveling, and the second gear is set as the starting gear position. In the utility vehicle 1, a predetermined gear position is automatically selected and operated based on a gear position map indicating a relationship between a vehicle speed, an accelerator opening, and a gear position in accordance with a traveling state. In the transmission 10, a state in which the rotation of the first input shaft 11a is transmitted to the output shaft 12 and a state in which the rotation of the second input shaft 11b is transmitted to the output shaft 12 are sequentially switched to switch the gear position. The switching of the gear position includes shift-up for increasing the ordinal number of the gear position to decrease the reduction ratio and shift-down for decreasing the ordinal number of the gear position to increase the reduction ratio.

At the time of switching the shift-up, the gear position is switched by switching the fastening and releasing of the first friction clutch 13a and the second friction clutch 13b in a state where the gear-position gear trains before and after the switching are in the power transmittable state. For example, at the time of switching from the third gear position to the fourth gear position, the gear position is switched to the fourth gear position by disengaging the first friction clutch 13a and fastening the second friction clutch 13b from the third gear position in which the first friction clutch 13a is fastened and the second friction clutch 13b is released while the third gear-position gear train 33 and the fourth gear-position gear train 34 are in the power transmittable state.

At the time of switching the shift-down, the gear position is switched by switching the fastening and releasing of the first friction clutch 13a and the second friction clutch 13b in a state where the gear-position gear trains before and after the switching are in the power transmittable state. For example, at the time of switching from the fourth gear to the third gear position, the gear position is switched to the third gear by fastening the first friction clutch 13a and releasing the second friction clutch 13b from the fourth gear in which the first friction clutch 13a is released and the second friction clutch 13b is fastened while the fourth gear-position gear train 34 and the third gear-position gear train 33 are in the power transmittable state.

The shift fork 50 includes first, second, and third shift forks 51, 52, and 53 that move the first, second, and third engaging clutches 41, 42, and 43, respectively. Each of the shift forks 51 to 53 is connected to the dog rings 41a to 43a of respective engaging clutches 41 to 43. The engaging clutches 41 to 43 are moved in the axial direction of the input shaft 11 or the output shaft 12 by the movement of the shift forks 51 to 53.

The hydraulic actuator 60 includes first, second, and third hydraulic actuators 61, 62, and 63 that move the shift forks 51 to 53, respectively. As the hydraulic actuators 61 to 63, hydraulic cylinders are used. Each of the hydraulic cylinders 61 to 63 is configured to move the engaging clutches 41 to 43 to the engagement position and the neutral position by controlling the hydraulic pressure supplied to the hydraulic cylinders 61 to 63.

The hydraulic actuators 61 to 63 are supplied with hydraulic pressure through a hydraulic control circuit (not illustrated) including a hydraulic pressure switching valve and a hydraulic pressure control valve. The hydraulic control circuit is also formed to supply hydraulic pressure to the hydraulic chambers of the first and second friction clutches 13a and 13b.

Figure 4:
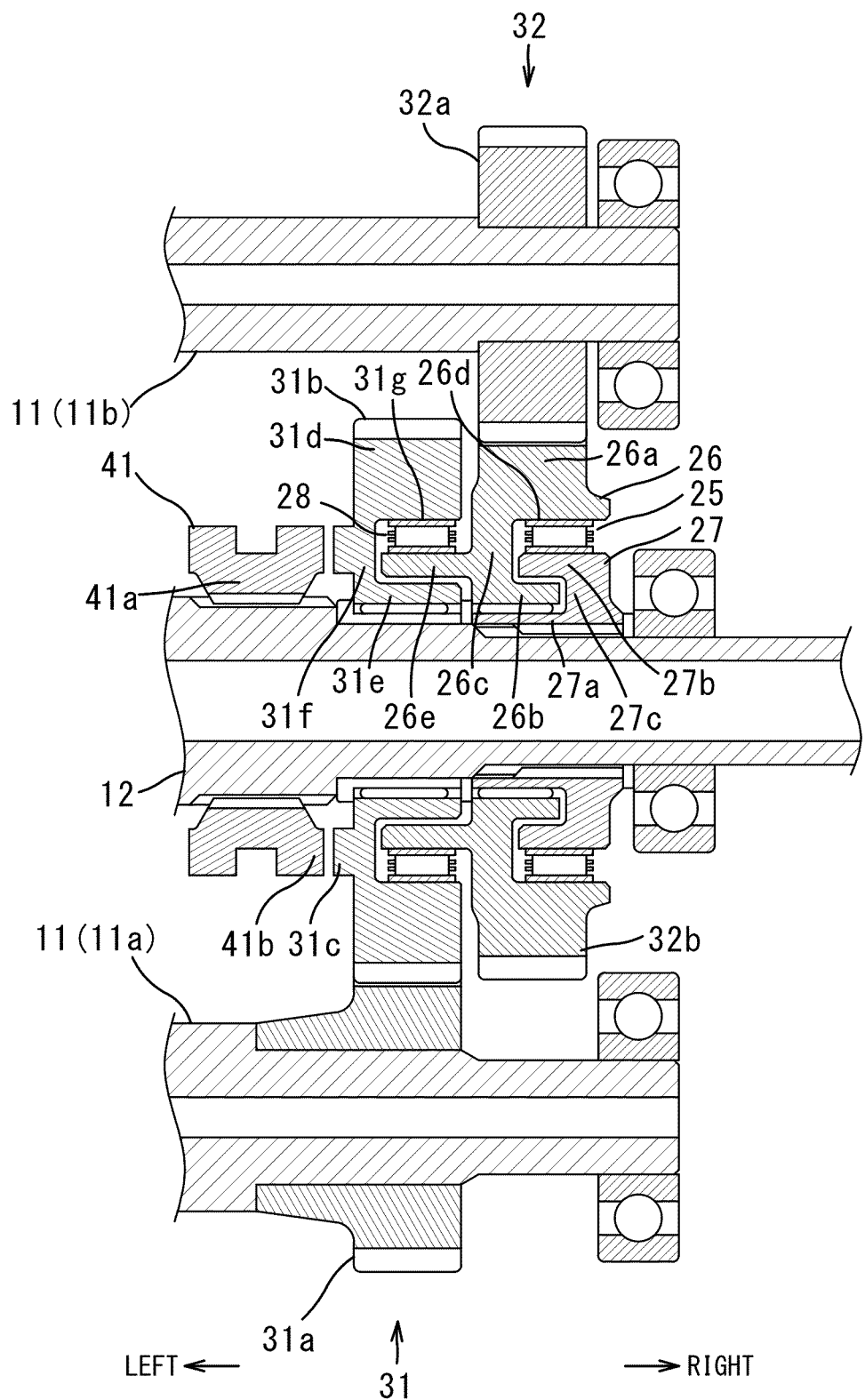
FIG. 4 is a cross-sectional view of a main part of the transmission.

FIG. 4 is a cross-sectional view of a main part of the transmission. As illustrated in FIG. 4, the first gear-position gear train 31 includes the first-gear drive gear 31a fixed to the first input shaft 11a and the first-gear driven gear 31b rotatably supported by the output shaft 12. The second gear-position gear train 32 includes the second-gear drive gear 32a fixed to the second input shaft 11b and the second-gear driven gear 32b provided with the one-way clutch 25 and fixed to the output shaft 12. The first gear-position gear train 31 is disposed on the left side of the vehicle body on one side in the axial direction of the output shaft 12 so as to face the second gear-position gear train 32. The first engaging clutch 41 is disposed so as to face the first gear-position gear train 31.

The second-gear driven gear 32b includes a first gear member 26 that meshes with the second-gear drive gear 32a and a second gear member 27 spline-fitted and fixed to the output shaft 12. The first one-way clutch 25 is disposed between the first gear member 26 and the second gear member 27.

The first one-way clutch 25 is disposed in a predetermined gear-position gear train 32 having a maximum reduction ratio among a plurality of gear-position gear trains having drive gears provided on the same input shaft 11b. In the transmission 10, the first one-way clutch 25 is disposed in the second gear-position gear train 32 having the maximum reduction ratio in the gear-position second gear trains 30b.

The first gear member 26 includes an outer peripheral portion 26a that meshes with the second-gear drive gear 32a, an inner peripheral portion 26b that is rotatably supported by the second gear member 27, and a connecting portion 26c that connects the outer peripheral portion 26a and the inner peripheral portion 26b. The first gear member 26 has a concave portion (recess) 26d recessed in a substantially cylindrical shape on the vehicle body right side, on the vehicle body right side of the first gear member 26, and has a convex portion 26e protruding in a substantially cylindrical shape in a direction from the second gear-position gear train 32 toward the first gear-position gear train 31 in the axial direction of the output shaft 12, on a side facing the first gear-position gear train 31.

The second gear member 27 includes an inner peripheral portion 27a spline-fitted and fixed to the output shaft 12, an outer peripheral portion 27b disposed in the concave portion 26d of the first gear member 26, and a connecting portion 27c connecting the inner peripheral portion 27a and the outer peripheral portion 27b.

The first one-way clutch 25 is disposed in the concave portion 26d of the first gear member 26 and is disposed between the inner peripheral surface of the outer peripheral portion 26a of the first gear member 26 and the outer peripheral surface of the outer peripheral portion 27b of the second gear member 27. The first one-way clutch 25 can transmit rotation only in a direction from the drive source 6 toward the drive wheel 2, and cannot transmit rotation in a direction from the drive wheel 2 toward the drive source 6. The first one-way clutch 25 prevents the relative rotation of the first gear member 26 and the second gear member 27 in the power transmission path in the direction from the drive source 6 toward the drive wheel 2, and allows the relative rotation of the second gear member 27 and the first gear member 26 in the power transmission path in the direction from the drive wheel 2 toward the drive source 6.

In the transmission 10, the first one-way clutch 25 is disposed in the one of the gear-position second input shaft gear trains 30b having a largest reduction ratio among the gear-position second input shaft gear trains 30b that is smaller than the one of the gear-position first input shaft gear trains 30a having the largest reduction ratio among the gear-position first input shaft gear trains 30a, and the first one-way clutch 25 that transmits rotation only in the direction from the drive source 6 toward the drive wheel 2 is not disposed in the one of the gear-position first input shaft gear trains 30a having the largest reduction ratio that is smaller than the one the gear-position second input shaft gear trains 30b having the largest reduction ratio. In other words, the first one-way clutch 25 is disposed only in the one of the plurality of gear-position gear trains 30 having the smaller reduction ratio between the one of the gear-position first input shaft gear trains 30a having the largest reduction ratio and the one of the gear-position second input shaft gear trains 30b having the largest reduction ratio.

The transmission 10 includes the first gear-position gear train 31 as a facing gear-position gear train which faces the second gear-position gear train 32 in which the first one-way clutch 25 is disposed in the axial direction of the output shaft 12. The first gear-position gear train 31 includes the first-gear driven gear 31b facing the second-gear driven gear 32b in the axial direction of the output shaft 12. The first-gear driven gear 31b is rotatably supported by the output shaft 12.

The first-gear driven gear 31b includes an outer peripheral portion 31d that meshes with the first-gear drive gear 31a, an inner peripheral portion 31e rotatably supported by the output shaft 12, and a connecting portion 31f connecting the outer peripheral portion 31d and the inner peripheral portion 31e. The first-gear driven gear 31b has a concave portion (recess) 31g that is recessed in a substantially cylindrical shape in a direction from the second gear-position gear train 32 toward the first gear-position gear train 31 in the axial direction of the output shaft 12 on a side facing the second gear-position gear train 32. The convex portion 26e of the first gear member 26 of the second-gear driven gear 32b is disposed in the concave portion 31g of the first-gear driven gear 31b.

The second one-way clutch 28 is disposed between the first-gear driven gear 31b and the first gear member 26 of the second-gear driven gear 32b. The second one-way clutch 28 is disposed in the concave portion (recess) 31g of the first-gear driven gear 31b and is disposed between the inner peripheral surface of the outer peripheral portion 31d of the first-gear driven gear 31b and the outer peripheral surface of the convex portion 26e of the second-gear driven gear 32b. The second one-way clutch 28 can transmit rotation only in the direction from the drive wheel 2 toward the drive source 6, and cannot transmit rotation in the direction from the drive source 6 toward the drive wheel 2. The second one-way clutch 28 prevents the relative rotation of the first-gear driven gear 31b and the first gear member 26 in the power transmission path in the direction from the drive wheel 2 toward the drive source 6, and allows the relative rotation of the first gear member 26 and the first-gear driven gear 31b in the power transmission path in the direction from the drive source 6 toward the drive wheel 2. As the one-way clutches 25 and 28, sprag-type one-way clutches having a plurality of sprags interposed between the outer ring and the inner ring can be used. As the one-way clutches 25 and 28, other one-way clutches such as roller type one-way clutches in which a roller is interposed between the outer ring and the inner ring may be used.

In the utility vehicle 1, power from the drive source 6 is transmitted to the output shaft 12 via the gear-position gear train 30 provided between the input shaft 11 and the output shaft 12, and is transmitted to the left and right wheels 2. The gear-position gear train 30 excluding the second gear-position gear train 32 is brought into the power transmittable state by the movement of the engaging clutch 40, while the second gear-position gear train 32 is brought into the power transmittable state by the first one-way clutch 25.

As indicated by a thick line in FIG. 3, in the second gear position, the power from the drive source 6 is transmitted to the output shaft 12 through the second friction clutch 13b, the second input shaft 11b, and the second gear-position gear train 32 including the first one-way clutch 25 without moving the engaging clutch 40, and is transmitted to the drive wheel 2.

Figure 5:
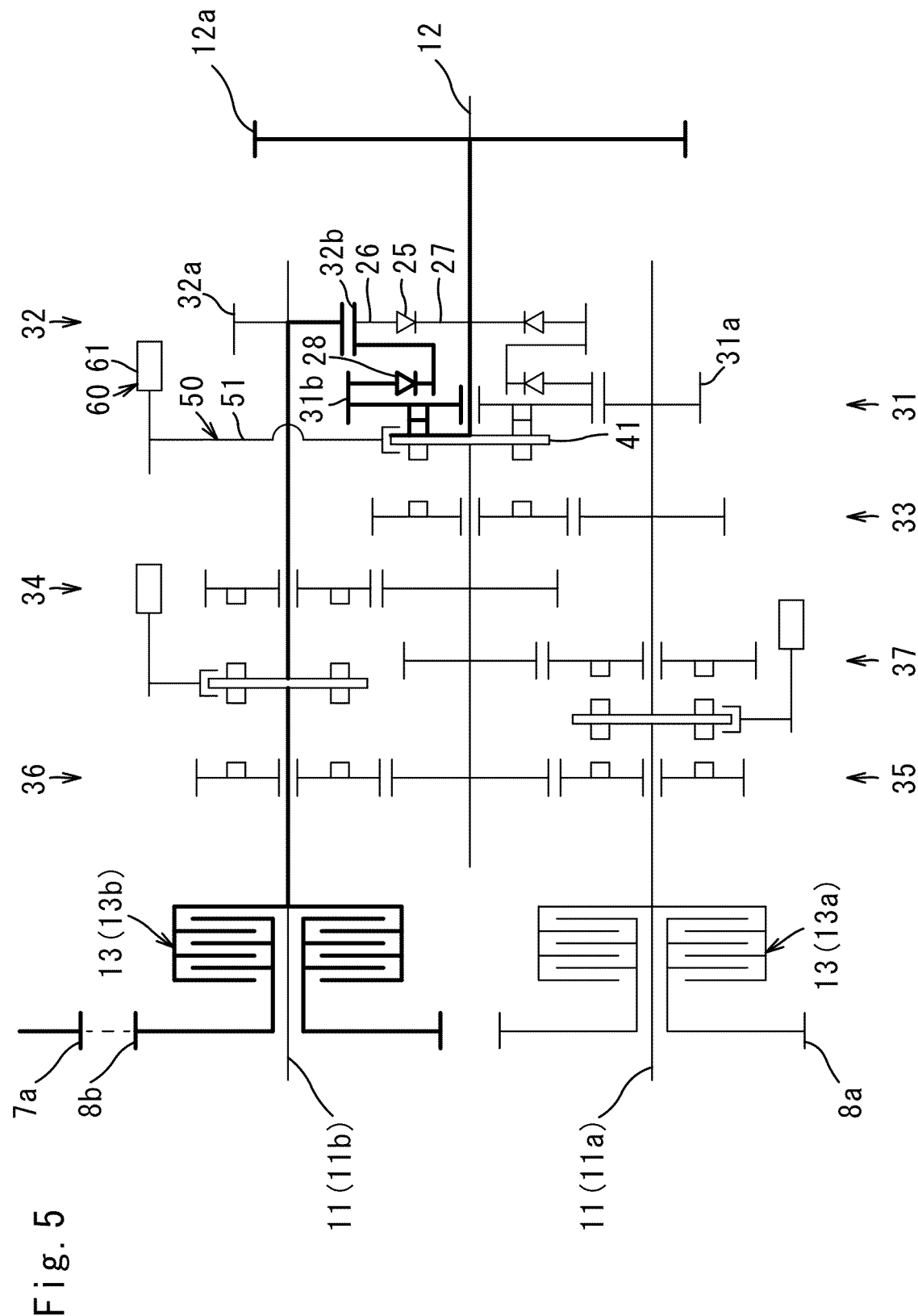
FIG. 5 is a view illustrating a power transmission path at the time of deceleration of the utility vehicle.

FIG. 5 is a view illustrating a power transmission path at the time of deceleration of the utility vehicle. In the second gear position, since the power from the drive source 6 is transmitted via the first one-way clutch 25, there is a possibility that the engine brake cannot be operated at the time of deceleration. In the transmission 10, the engine brake is operated through the first engaging clutch 41 and the second one-way clutch 28 for the second gear position at the time of deceleration.

In the utility vehicle 1, in order to effectively operate the engine brake in accordance with the vehicle speed during traveling in the fully closed state of the accelerator at the time of deceleration, the transmission 10 is controlled on the basis of the gear position map so as to achieve a gear position in accordance with the vehicle speed. When the engine brake is operated in gear positions other than the second gear position, the rotation from the drive wheel 2 is transmitted to the drive source 6 through the gear-position gear train 30 in a gear position set according to the vehicle speed, and the engine brake is operated. For example, in the third gear position, the rotation from the drive wheel 2 is transmitted from the output shaft 12 to the drive source 6 through the first engaging clutch 41, the third gear-position gear train 33, the first input shaft 11a, and the first friction clutch 13a to operate the engine brake.

When the engine brake is operated in the second gear position, the first engaging clutch 41 is moved to the first-gear engagement position, and the first friction clutch 13a is released to fasten the second friction clutch 13b. As a result, as indicated by thick lines in FIG. 5, the rotation from the drive wheel 2 is transmitted from the output shaft 12 to the drive source 6 through the first engaging clutch 41, the first-gear driven gear 31b, the second one-way clutch 28, the first gear member 26 of the second-gear driven gear 32b, the second-gear drive gear 32, the second input shaft 11b, and the second friction clutch 13b, and the engine brake is operated.

Figure 6:
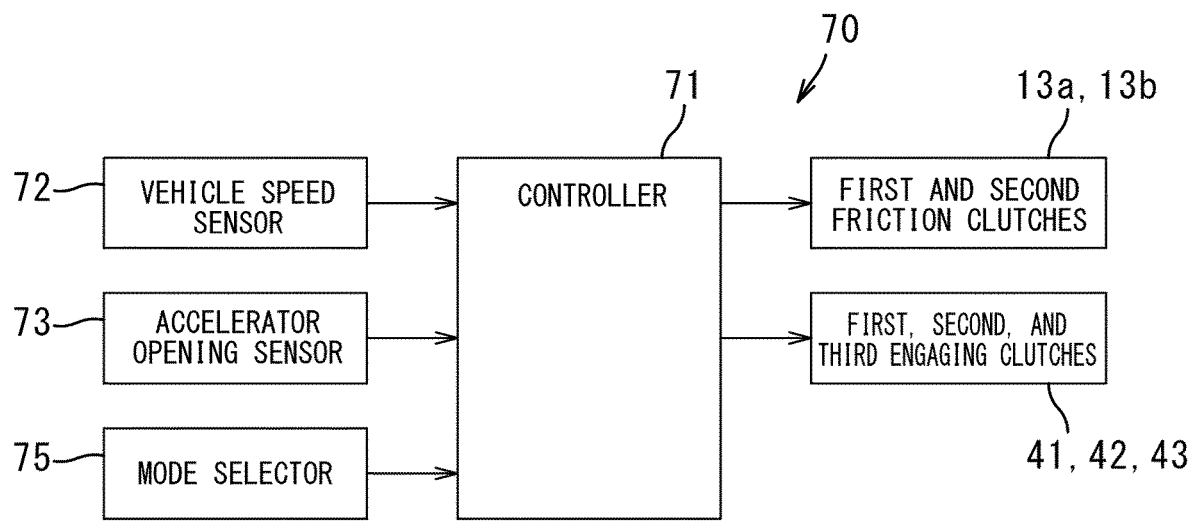
FIG. 6 is a block diagram illustrating control of the transmission.

FIG. 6 is a block diagram illustrating control of the transmission. As illustrated in FIG. 6, the utility vehicle 1 includes a transmission control device 70 that controls the operation of the transmission 10. The transmission control device 70 includes a controller 71 that controls hydraulic pressure. The controller 71 controls the movement of the first, second, and third engaging clutches 41 to 43 by controlling the operation of a hydraulic control valve or the like. The controller 71 also controls the operation of the first and second friction clutches 13a and 13b by controlling the operation of a hydraulic control valve or the like.

The utility vehicle 1 includes a vehicle speed sensor 72 that detects a vehicle speed, an accelerator opening sensor 73 that detects a depression amount (accelerator opening) of an accelerator pedal, a mode selector 75, and the like. Signals from the vehicle speed sensor 72, the accelerator opening sensor 73, and the mode selector 75 are input to the controller 71. The mode selector 75 is set to the forward high-speed mode during the normal traveling.

The controller 71 stores a gear position map indicating the relationship between the vehicle speed and the accelerator opening of the utility vehicle 1 and the gear position. In the gear position map, a gear position switching line is set, and a switching line for upshifting and downshifting is set.

The controller 71 automatically selects and operates a gear position based on the gear position map according to the traveling state of the utility vehicle 1, specifically, the vehicle speed and the accelerator opening. The controller 71 controls the operations of the first friction clutch 13a and the second friction clutch 13b and controls the movement of the first, second, and third engaging clutches 41, 42, and 43 according to the vehicle speed and the accelerator opening.

In the forward high-speed mode, the controller 71 controls the gear position so as to correspond to the traveling state in a state in which two gear-position gear trains among the second gear position, which is the starting gear position, to the seventh gear position are set to the power transmittable state. In the forward low-speed mode, the gear train is controlled to the first gear position or the second gear position in accordance with the traveling state in a state in which the two gear-position gear trains of the first gear position and the second gear position are in the power transmittable state.

The utility vehicle 1 includes a dual clutch transmission 10, and the forward high-speed mode is set during the normal traveling, and the second gear is set as the starting gear position. Then, the one-way clutch 25 does not bring the first gear into the power transmission state, but brings the second gear which is the starting gear position into the power transmittable state. As a result, the second gear which is the starting gear position can be achieved by the one-way clutch 25, and the normal starting state can be maintained. When the forward low-speed mode is selected by the driver's operation, the first gear can be used as a gear position for starting on a slope with a steep slope, riding over a large obstacle, or the like.

The controller 71 is controlled such that a gear position corresponding to the vehicle speed is selected also at the time of deceleration. In order to operate the engine brake, in a case where the third gear position is shifted down to the second gear position based on the vehicle speed at the time of deceleration, when the second gear-position gear train 32 is brought into the power transmittable state, the controller 71 controls the movement of the first engaging clutch 41 so as to switch the first gear-position gear train 31 to the power transmittable state, and controls the operations of the first and second friction clutches 13a and 13b so as to release the first friction clutch 13a and fasten the second friction clutch 13b.

As described above, when the second gear-position gear train 32 is brought into the power transmittable state at the time of deceleration, the engaging clutch 41 is moved so as to switch the first gear-position gear train 31 to the power transmittable state. Therefore, when the second gear-position gear train 32 is brought into the power transmittable state at the time of deceleration, the first gear-position gear train 31 is brought into the power transmittable state, the rotation of the drive wheels 2 can be transmitted from the output shaft 12 to the second-gear drive gear 32a of the second gear-position gear train 32, and the engine brake can be operated also for the second gear position.

In the transmission 10 according to the present embodiment, the one-way clutch 25 that transmits rotation only in the direction from the drive source 6 toward the drive wheel 2 is disposed only in the second gear-position gear train 32. However, the one-way clutch 25 may be disposed only in the gear-position first gear train 30a, and may not be disposed in the gear-position second gear train 30b. In such a case, the one-way clutch 25 that transmits rotation only in the direction from the drive source 6 toward the drive wheel 2 is disposed in the first gear-position gear train 31 having the maximum reduction ratio in the gear-position first gear train 30a.

In the transmission 10, the second one-way clutch 28 that transmits rotation only in the direction from the drive wheel 2 toward the drive source 6 is disposed between the driven gear 31b of the first gear-position gear train 31 as a facing gear-position gear train and the first gear member 26 of the driven gear 32b of the second gear-position gear train 32. However, when another gear-position gear train faces the second gear-position gear train 32, the second one-way clutch that transmits rotation only in the direction from the drive wheel 2 toward the drive source 6 may be disposed between a driven gear of another gear-position gear train as a facing gear-position gear train and the first gear member 26 of the driven gear 32b of the second gear-position gear train 32.

The utility vehicle 1 according to the present embodiment includes the transmission 10 including: at least one input shaft 11 to which power from the drive source 6 is input; the output shaft 12 that outputs the power from the drive source 6 to the drive wheel 2; the plurality of gear-position gear trains 30 that includes the drive gears 31a to 37a provided on the input shaft 11 and the driven gears 31b to 37b provided on the output shaft 12; and the engaging clutch 40 that brings the gear-position gear train 30 into the power transmittable state. The one-way clutch 25 that transmits rotation only in a direction from the drive source 6 toward the drive wheel 2 is disposed in a predetermined gear-position gear train 32 having a maximum reduction ratio among the plurality of gear-position gear trains having drive gears provided on the same input shaft 11.

As a result, it is not necessary to use the engaging clutch to bring the predetermined gear-position gear train 32 into the power transmission state as compared with the case of using the plurality of engaging clutches 40 to bring the plurality of gear-position gear trains 30 into the power transmittable state, so that the number of engaging clutches can be reduced. When the gear-position gear train other than the predetermined gear-position gear train 32 having the maximum reduction ratio is brought into the power transmittable state, the one-way clutch 25 is idled, so that the power transmittable state of the other gear-position gear train can be realized. Therefore, it is possible to realize a multistage while suppressing the number of the engaging clutches 40. It is possible to enhance the traveling performance by preparing a low gear position having a large reduction ratio along with multistage.

In addition, since the number of engaging clutches can be reduced, it is possible to suppress an increase in size of the transmission. Therefore, the amount of change from the vehicle body on which the existing transmission is mounted can be reduced, and the transmission having the constantly-meshing gear structure can be mounted. For example, the amount of change from the vehicle body on which the continuously variable transmission is mounted can be reduced, and the transmission having the constantly-meshing gear structure can be mounted.

In addition, since the number of engaging clutches can be reduced, when the input shaft 11 and the output shaft 12 of the transmission 10 extend in the vehicle width direction, it is possible to suppress an increase in size of the transmission 10 in the vehicle width direction, and it is easy to dispose the transmission 10 such that the input shaft 11 and the output shaft 12 extend in the vehicle width direction. When the crank shaft of the engine serving as the drive source 6 and the input shaft 11 and the output shaft 12 of the transmission 10 extend in parallel in the vehicle width direction, it is possible to suppress the amount of protrusion of the transmission 10 in the vehicle width direction with respect to the drive source 6.

Figure 7:
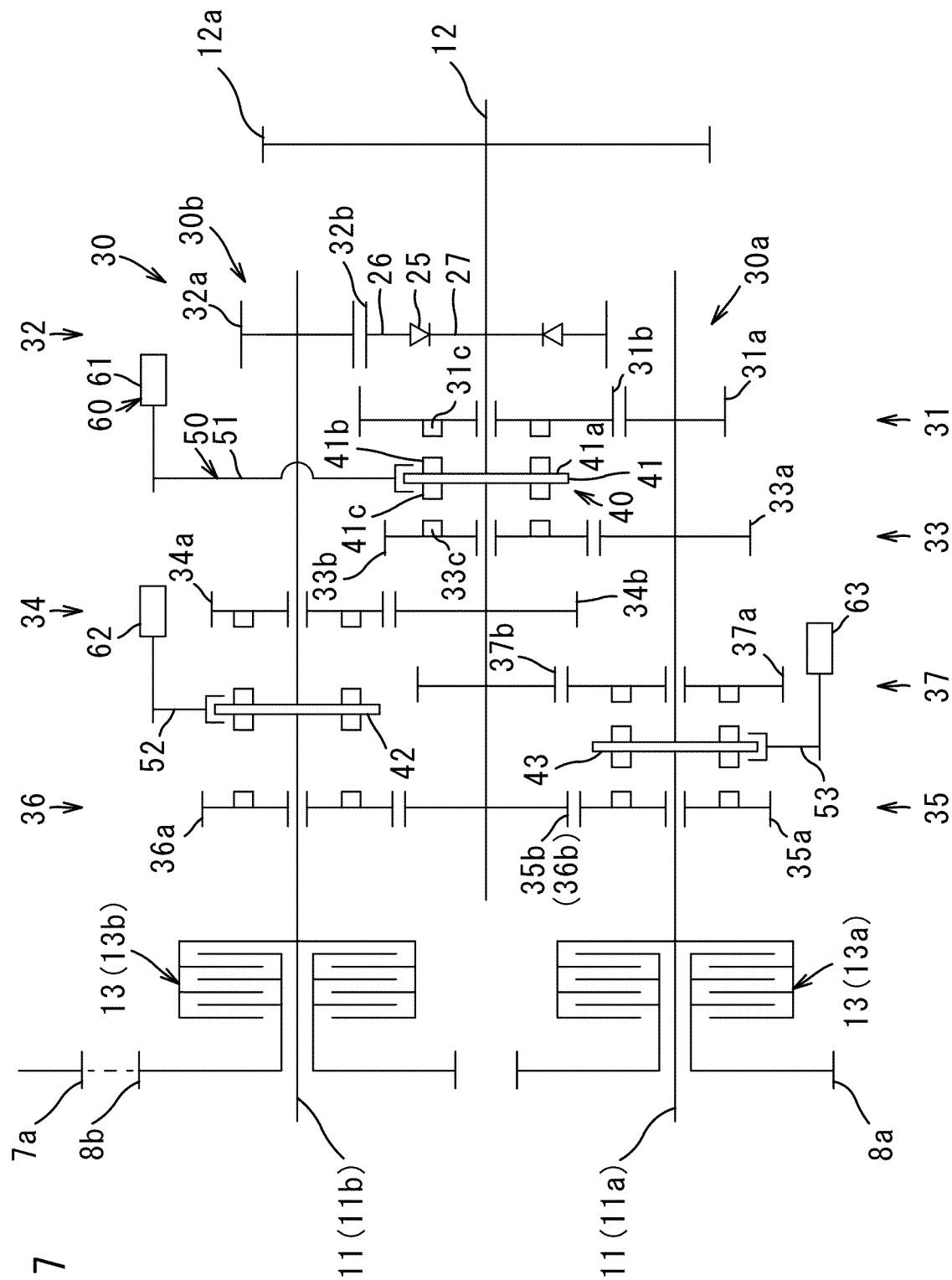
FIG. 7 is a schematic configuration diagram of a modification of the transmission.
Figure 8:
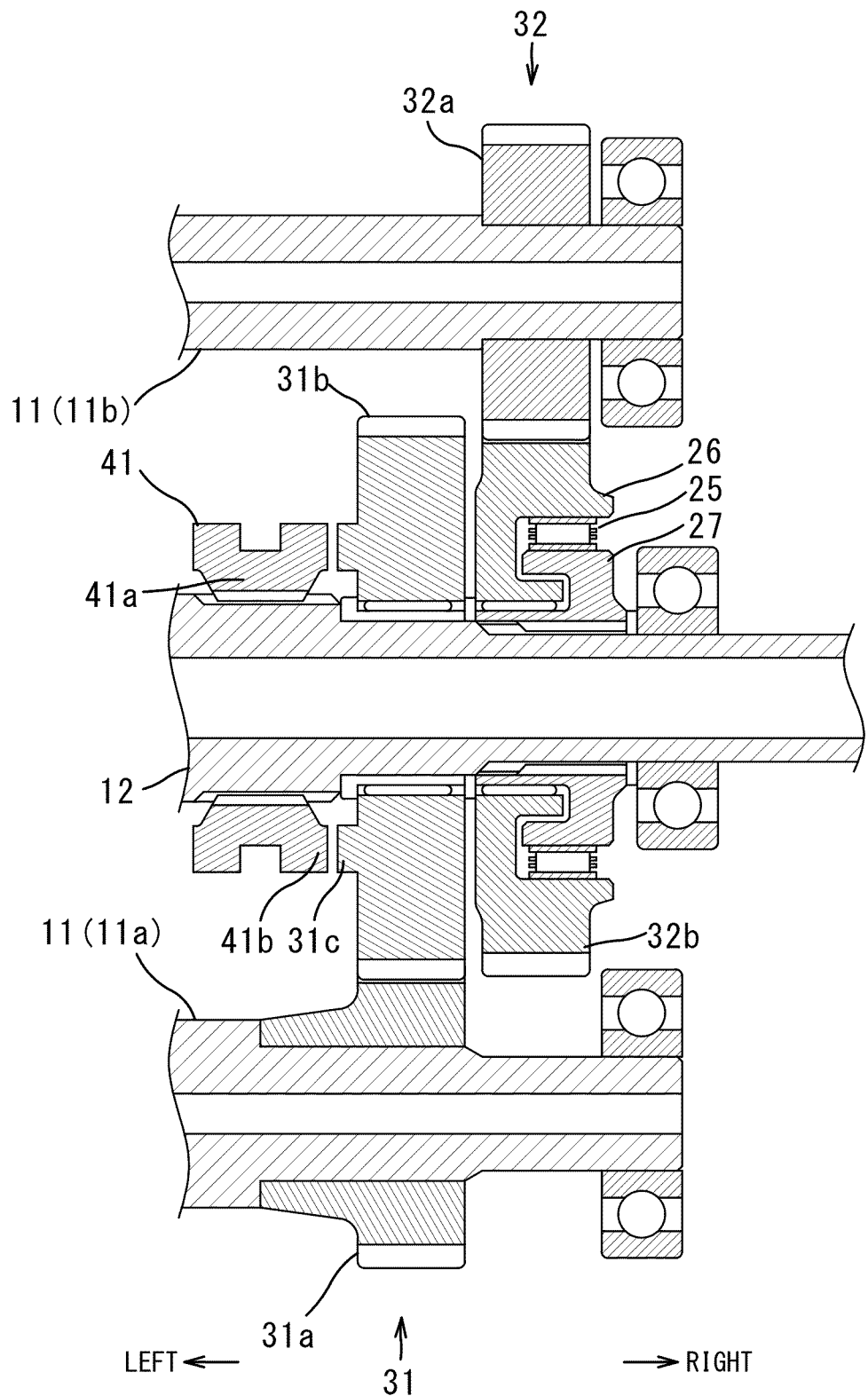
FIG. 8 is a cross-sectional view of a main part of the modification of the transmission.

FIG. 7 is a schematic configuration diagram of a modified example of the transmission, and FIG. 8 is a cross-sectional view of a main part of the modified example of the transmission. As illustrated in FIG. 7, in the transmission 10, the first one-way clutch 25 that transmits rotation only in the direction from the drive source 6 toward the drive wheel 2 may be disposed in the second gear-position gear train 32 which is a predetermined gear-position gear train having a maximum reduction ratio among the plurality of gear-position gear trains 30 having the drive gears provided on the same input shaft 11, and the second one-way clutch that transmits rotation only in the direction from the drive wheel 2 to the drive source 6 may not be disposed.

As illustrated in FIG. 8, the first one-way clutch 25 that transmits rotation only in the direction from the drive source 6 toward the drive wheel 2 may be disposed between the first gear member 26 and the second gear member 27 of the second-gear driven gear 32b, and the second one-way clutch may not be disposed between the driven gear 31b of the first gear-position gear train 31, which is a facing gear-position gear train which faces the second gear-position gear train 32, and the first gear member 26 of the driven gear 32b of the second gear-position gear train 32.

Even in such a transmission, since the one-way clutch 25 that transmits rotation only in the direction from the drive source 6 toward the drive wheel 2 is disposed in the predetermined gear-position gear train 32 having the maximum reduction ratio among the plurality of gear-position gear trains having the drive gears provided on the same input shaft 11, it is not necessary to use the engaging clutch in order to bring the predetermined gear-position gear train 32 into the power transmission state, so that the number of engaging clutches can be reduced.

In the present embodiment, the dual clutch transmission 10 that switches the plurality of gear-position gear trains 30 provided between the two input shafts 11 and the output shaft 12 has been described, but the present disclosure is also applicable to a transmission of a constantly-meshing type other than the dual clutch type. For example, the present disclosure can also be applied to a transmission in which a friction clutch that connects and disconnects power from a drive source to and from one input shaft is provided, and a plurality of gear-position gear trains provided between the input shaft and the output shaft is switched.

In such a case, the transmission includes: an input shaft to which power from a drive source is input; an output shaft that outputs the power from the drive source to a drive wheel; a plurality of gear-position gear trains each including a drive gear provided on the input shaft and a driven gear provided on the output shaft; and an engaging clutch that brings a gear-position gear train into a power transmittable state, in which a one-way clutch that transmits rotation only in a direction from the drive source toward the drive wheel is disposed in a predetermined gear-position gear train having a maximum reduction ratio among the plurality of gear-position gear trains including the drive gear provided on the input shaft.

In the present embodiment, the engaging clutch 40 is formed such that the clutch teeth of the dog ring and the clutch teeth of the gear facing the dog ring are engaged with each other, but the clutch teeth may be formed in one of the dog ring and the gear, an engagement hole may be formed in the other of the dog ring and the gear, and the clutch teeth and the engagement hole may be formed to be engaged with each other.

The engaging clutch 40 is moved using a hydraulic actuator, but may be moved using an electric motor or the like. The transmission 10 is automatically operated to a predetermined gear position in accordance with the traveling state by the controller 71, but may be manually operated to the predetermined gear position by the driver's operation. The transmission 10 is configured to achieve a seventh gear position, but can also be applied to a transmission that achieves a sixth gear position or less or an eighth gear position or more. Although the utility vehicle 1 equipped with the transmission 10 has been described, the present disclosure is also applicable to vehicles other than the utility vehicle.

As described above, a utility vehicle 1 according to the present embodiment includes the transmission 10 including: at least one input shaft 11 to which power from the drive source 6 is input; the output shaft 12 that outputs the power from the drive source 6 to the drive wheel 2; the plurality of gear-position gear trains 30 each including the drive gear provided on the input shaft 11 and the driven gear provided on the output shaft 12; and the engaging clutch 40 that brings the gear-position gear train 30 into the power transmittable state. The one-way clutch 25 that transmits rotation only in the direction from the drive source 6 toward the drive wheel 2 is disposed in the predetermined gear-position gear train 32 having the maximum reduction ratio among the plurality of gear-position gear trains 30 including drive gears provided on the same input shaft 11.

As a result, in the utility vehicle 1, the predetermined gear-position gear train 32 having the maximum reduction ratio among the plurality of gear-position gear trains provided on the same input shaft 11 can be brought into the power transmittable state from the drive source 6 to the drive wheel 2 by the one-way clutch 25. It is not necessary to use the engaging clutch to bring the predetermined gear-position gear train 32 into the power transmission state as compared with the case of using the plurality of engaging clutches to bring the plurality of gear-position gear trains 30 into the power transmittable state, so that the number of engaging clutches can be reduced. When the gear-position gear train other than the predetermined gear-position gear train 32 having the maximum reduction ratio is brought into the power transmittable state, the one-way clutch is idled, so that the power transmittable state of the other gear-position gear train can be realized. Therefore, it is possible to realize multistage while suppressing the number of the engaging clutches 40. It is possible to enhance the traveling performance by preparing a low gear position having a large reduction ratio along with multistage. For example, even when the transmission switching mechanism 17 that moves the engaging clutch 40 fails on an unpaved road away from the paved road surface, it is possible to bring the predetermined gear-position gear train 32 into the power transmittable state and move the utility vehicle 1 while maintaining the traveling performance.

In addition, the at least one input shaft 11 includes a first input shaft 11a and a second input shaft 11b, the plurality of gear-position gear trains 30 include a gear-position first gear train 30a and a gear-position second gear train 30b provided between the first input shaft 11a and the output shaft 12 and between the second input shaft 11b and the output shaft 12, respectively, and the one-way clutch 25 that transmits rotation only in the direction from the drive source 6 toward the drive wheel 2 is disposed in a predetermined gear-position gear train 32 having a maximum reduction ratio in one of the gear-position first gear train 30a and the gear-position second gear train 30b.

As a result, it is possible to reduce the number of engaging clutches in the transmission 10 which is a DCT provided with the plurality of gear-position gear trains 30 including the gear-position first gear train 30a and the gear-position second gear train 30b provided between the first input shaft 11a and the output shaft 12 and between the second input shaft 11b and the output shaft 12, respectively.

In addition, the utility vehicle 1 further includes the first friction clutch 13a and the second friction clutch 13b that connect and disconnect power from the drive source 6 input respectively to the first input shaft 11a and the second input shaft 11b, the one-way clutch 25 that transmits rotation only in the direction from the drive source 6 toward the drive wheel 2 is disposed in one of the gear-position first gear train 30a and the gear-position second gear train 30b, and the one-way clutch that transmits rotation only in the direction from the drive source 6 toward the drive wheel 2 is not disposed in the other of the gear-position first gear train 30a and the gear-position second gear train 30b.

As a result, the first one-way clutch 25 that transmits rotation only in the direction from the drive source 6 toward the drive wheel 2 is disposed only in one of the gear-position first gear train 30a and the gear-position second gear train 30b. The second one-way clutch 28 that transmits rotation only in the direction from the drive wheel 2 toward the drive source 6 is disposed on the other of the gear-position first gear train 30a and the gear-position second gear train 30b, and the drive source side of the second one-way clutch 28 and the drive source side of the first one-way clutch 25 are connected, so that the engine brake can be operated even for a predetermined gear position when the engine is used as the drive source 6.

In addition, the utility vehicle further 1 includes a first friction clutch 13a and a second friction clutch 13b that connect and disconnect power from the drive source 6 input respectively to the first input shaft 11a and the second input shaft 11b, the one-way clutch 25 that transmits rotation only in the direction from the drive source 6 toward the drive wheel 2 is disposed in the gear-position gear train 32 having the smaller maximum reduction ratio between the gear-position first gear train 30a and the gear-position second gear train 30b, and the one-way clutch that transmits rotation only in the direction from the drive source 6 toward the drive wheel 2 is not disposed in the gear-position gear train having the larger maximum reduction ratio between the gear-position first gear train 30a and the gear-position second gear train 30b.

As a result, the first one-way clutch 25 that transmits rotation only in the direction from the drive source 6 toward the drive wheel 2 is disposed only in the gear-position gear train 30b having the smaller maximum reduction ratio between the gear-position first gear train 30a and the gear-position second gear train 30b. The second one-way clutch 28 that transmits rotation only in the direction from the drive wheel 2 toward the drive source 6 is disposed on the other of the gear-position first gear train 30a and the gear-position second gear train 30b, and the drive source side of the second one-way clutch 28 and the drive source side of the first one-way clutch 25 are connected, so that the engine brake can be operated even for a predetermined gear position when the engine is used as the drive source 6.

Further, the one-way clutch 25 that transmits rotation only in the direction from the drive source 6 toward the drive wheel 2 is disposed in the driven gear 32b of the predetermined gear-position gear train 32. As a result, the driven gear 32b has a gear diameter larger than that of the drive gear 32a, and the one-way clutch 25 can be easily disposed as compared with the case where the one-way clutch 25 is disposed in the drive gear 32a.

Further, the driven gear 32b of the predetermined gear-position gear train 32 includes the first gear member 26 that meshes with the drive gear 32a of the predetermined gear-position gear train 32, and the second gear member 27 that is rotated together with the output shaft 12, in which the first one-way clutch 25 that transmits rotation only in the direction from the drive source 6 toward the drive wheel 2 is disposed between the first gear member 26 and the second gear member 27, the plurality of gear-position gear trains 30 include the facing gear-position gear train 31 which faces the predetermined gear-position gear train 32 in the axial direction of the output shaft 12, and the second one-way clutch 28 that transmits rotation only in the direction from the drive wheel 2 toward the drive source 6 is disposed between the driven gear 31b of the facing gear-position gear train 31 and the first gear member 26 of the driven gear 32b of the predetermined gear-position gear train 32.

Accordingly, the number of engaging clutches can be reduced by the first one-way clutch 25 disposed in the driven gear 32b of the predetermined gear-position gear train 32. When the second one-way clutch 28 disposed between the driven gear 31b of the facing gear-position gear train 31 and the first gear member 26 of the driven gear 32b of the predetermined gear-position gear train 32 brings the predetermined gear-position gear train into the power transmittable state at the time of deceleration, the facing gear-position gear train 31 is brought into the power transmittable state, so that the rotation of the drive wheel 2 can be transmitted from the output shaft 12 to the drive gear 32a of the predetermined gear-position gear train 32 via the driven gear 31b of the facing gear-position gear train 31 and the second one-way clutch 28, and the engine brake can be operated even for the predetermined gear position.

In addition, the driven gear 31b of the facing gear-position gear train 31 includes, on a side facing the predetermined gear-position gear train 32, a concave portion (recess) 31g that is recessed in a direction from the predetermined gear-position gear train 32 toward the facing gear-position gear train 31 in the axial direction of the output shaft 12, and the second one-way clutch 28 is disposed in the concave portion 31g of the driven gear 31b of the facing gear-position gear train 31. As a result, it is possible to make the transmission 10 compact in the axial direction of the output shaft 12 as compared with a case where no concave portion is provided in the driven gear 31b of the facing gear-position gear train 31.

In addition, the predetermined gear-position gear train 32 is a second gear-position gear train 32, and the facing gear-position gear train 31 is a first gear-position gear train 31. As a result, in the utility vehicle 1 including the transmission 10 having the first gear-position gear train 31 facing the second gear-position gear train 32 in the axial direction of the output shaft 12, the number of engaging clutches can be reduced, and the utility vehicle 1 can travel with the second gear-position gear train set in the power transmittable state even when a failure occurs in which the engaging clutches do not move. The second gear-position gear train 32 is set as the starting gear-position gear train 32 in the power transmittable state by the one-way clutch 25, so that the starting operation can be made smooth.

In addition, the utility vehicle 1 further includes a controller 71 that controls movement of the engaging clutch 40, and the controller 71 controls the movement of the engaging clutch 40 so as to switch a state of the facing gear-position gear train 31 to the power transmittable state when bringing the predetermined gear-position gear train 32 into a power transmittable state based on a vehicle speed at the time of deceleration. As a result, the rotation of the drive wheel 2 can be transmitted from the output shaft 12 to the predetermined gear-position gear train 32 at the time of deceleration, and the engine brake can be operated also for the predetermined gear position.

In addition, the first input shaft 11a is provided with the drive gear 32a of the predetermined gear-position gear train 32, the second input shaft 11b is provided with a drive gear 31a of the facing gear-position gear train 31, the controller 71 controls the movement of the engaging clutch 40 and controls operations of the first friction clutch 13a and the second friction clutch 13b, and the controller 71 controls the operations of the first friction clutch 13a and the second friction clutch 13b so as to release the first friction clutch 13a and fasten the second friction clutch 13b when the controller 71 controls the movement of the engaging clutch 40 so as to switch a state of the facing gear-position gear train 31 to the power transmittable state when bringing the predetermined gear-position gear train 32 into the power transmittable state based on the vehicle speed at the time of deceleration. As a result, when the engaging clutch 40 is moved so as to switch a state of the facing gear-position gear train 31 to the power transmittable state at the time of deceleration, the first friction clutch 13a is fasten and the second friction clutch 13b is released, so that the engine brake can be operated for a predetermined gear position at the time of deceleration.

The present disclosure is not limited to the illustrated embodiment, and various improvements and design changes can be made without departing from the gist of the present disclosure.

What is claimed is:

1. A utility vehicle comprising a transmission, the transmission including:
    an input shaft to which power from a drive source is input;
    an output shaft to output the power from the drive source to a drive wheel;
    a plurality of gear-position gear trains each including a drive gear on the input shaft and a driven gear on the output shaft; and
    an engaging clutch to bring a gear-position gear train of the plurality of gear-position gear trains into a power transmittable state to transmit power from the input shaft to the output shaft,
    wherein one of the plurality of gear-position gear trains having a largest reduction ratio among reduction ratios of the plurality of gear-position gear trains includes a one-way clutch to transmit rotation only in a direction from the drive source toward the drive wheel, and
    wherein the one-way clutch of the one of the plurality of gear-position gear trains is located in a power transmission path between the input shaft and the output shaft, wherein the one-way clutch is in the driven gear of the one of the plurality of gear-position gear trains, wherein the driven gear of the one of the plurality of gear-position gear trains has a gear diameter larger than a gear diameter of the drive gear of the one of the plurality of gear-position gear trains, and wherein the driven gear of the one of the plurality of gear-position gear trains includes a first gear member to mesh with the drive gear of the one of the plurality of gear-position gear trains, and a second gear member rotated together with the output shaft, and the one-way clutch is disposed between the first gear member and the second gear member of the driven gear.

2. The utility vehicle according to claim 1, wherein the input shaft is a first input shaft, and the utility vehicle further comprising a second input shaft, wherein the plurality of gear-position gear trains include a plurality of gear-position first input shaft gear trains between the first input shaft and the output shaft including a gear-position first gear train having the largest reduction ratio among reduction ratios of the plurality of gear-position first input shaft gear trains, and wherein the plurality of gear-position gear trains further includes a plurality of gear-position second input shaft gear trains between the second input shaft and the output shaft including a gear-position second gear train, having a largest reduction ratio among reduction ratios of the plurality of gear-position second input shaft gear trains, and wherein the one-way clutch is disposed in a first one of the gear-position first gear train and the gear-position second gear train.

3. The utility vehicle according to claim 2, further comprising a first friction clutch and a second friction clutch configured to connect and disconnect power from the drive source input to a respective one of the first input shaft and the second input shaft, wherein the one-way clutch is disposed in the first one of the gear-position first gear train and the gear-position second gear train, and wherein the one-way clutch is not disposed in a second one of the gear-position first gear train and the gear-position second gear train different than the first one of the gear-position first gear train and the gear-position second gear train.

4. The utility vehicle according to claim 2, further comprising a first friction clutch and a second friction clutch configured to connect and disconnect power from the drive source input to a respective one of the first input shaft and the second input shaft, wherein the one-way clutch is disposed in the first one of the gear-position first gear train and the gear-position second gear train having a smaller reduction ratio between the gear-position first gear train and the gear-position second gear train, and wherein the one-way clutch is not disposed in a second one of the gear-position first gear train and the gear-position second gear train having a larger reduction ratio between the gear-position first gear train and the gear-position second gear train.

5. The utility vehicle according to claim 2, wherein the gear-position first gear train is the one of the plurality of gear-position gear trains including the driven gear having the one-way clutch therein and including the first gear member to mesh with the drive gear of the gear-position first gear train, and the second gear member rotated together with the output shaft, the one-way clutch being a first one-way clutch to transmit rotation only in the direction from the drive source toward the drive wheel between the first gear member and the second gear member of the gear-position first gear train, wherein the gear-position second gear train of the plurality of gear-position second input shaft gear trains faces the gear-position first gear train in an axial direction of the output shaft, and wherein the utility vehicle further comprises a second one-way clutch that transmits rotation only in the direction from the drive wheel toward the drive source and is disposed between a driven gear of the gear-position second gear train and the first gear member of the driven gear of the gear-position first gear train.

6. The utility vehicle according to claim 5, wherein the driven gear of the gear-position second gear train includes, on a side facing the gear-position first gear train, a recess formed in a direction from the gear-position first gear train toward the gear-position second gear train in the axial direction of the output shaft, and wherein the second one-way clutch is in the recess of the driven gear of the gear-position second gear train.

7. The utility vehicle according to claim 5, wherein the engaging clutch is configured to be moved so as to switch a state of the gear-position second gear train to the power transmittable state when bringing the gear-position first gear train into a power transmittable state when traveling during a fully-closed state of an accelerator at a time of deceleration.

8. The utility vehicle according to claim 7, wherein the first input shaft includes the drive gear of the gear-position first gear train, wherein the second input shaft includes a drive gear of the gear-position second gear train, wherein a first friction clutch is configured to be released and a second friction clutch is configured to be fastened when the engaging clutch is moved so as to switch a state of the gear-position second gear train to the power transmittable state when the gear-position first gear train is brought into the power transmittable state when traveling during a fully-closed state of an accelerator at the time of deceleration.

9. A transmission comprising:

an input shaft to which power from a drive source is input;

an output shaft to output the power from the drive source to a drive wheel;

a plurality of gear-position gear trains each including a drive gear on the input shaft and a driven gear on the output shaft; and an engaging clutch to bring a gear-position gear train of the plurality of gear-position gear trains into a power transmittable state to transmit power from the input shaft to the output shaft, wherein one of the plurality of gear-position gear trains having a largest reduction ratio among reduction ratios of the plurality of gear-position gear trains includes a one-way clutch to transmit rotation only in a direction from the drive source toward the drive wheel, wherein the one-way clutch of the first one of the plurality of gear-position gear trains is located in a power transmission path between the input shaft and the output shaft, wherein the one-way clutch is in the driven gear of the one of the plurality of gear-position gear trains, wherein the driven gear of the one of the plurality of gear-position gear trains has a gear diameter larger than a gear diameter of the drive gear of the one of the plurality of gear-position gear trains, and wherein the driven gear of the one of the plurality of gear-position gear trains includes a first gear member to mesh with the drive gear of the one of the plurality of gear-position gear trains, and a second gear member rotated together with the output shaft, and the one-way clutch is disposed between the first gear member and the second gear member of the driven gear.

10. The transmission according to claim 9, wherein the input shaft is a first input shaft, and the utility vehicle further comprising a second input shaft, wherein the plurality of gear-position gear trains include a plurality of gear-position first input shaft gear trains between the first input shaft and the output shaft and includes a gear-position first gear train having the largest reduction ratio among reduction ratios of the plurality of gear-position first input shaft gear trains, and wherein the plurality of gear-position gear trains further include a plurality of gear-position second input shaft gear trains between the second input shaft and the output shaft including a gear-position second gear train, having a largest reduction ratio among reduction ratios of the plurality of gear-position second input shaft gear trains, and wherein the one-way clutch is disposed in a first one of the gear-position first gear train and the gear-position second gear train.

11. The transmission according to claim 10, wherein the gear-position first gear train is the one of the plurality of gear-position gear trains including the driven gear having the one-way clutch therein and including the first gear member to mesh with the drive gear of the gear-position first gear train, and the second gear member rotated together with the output shaft, the one-way clutch being a first one-way clutch to transmit rotation only in the direction from the drive source toward the drive wheel between the first gear member and the second gear member of the gear-position first gear train, wherein the gear-position second gear train of the plurality of gear-position second input shaft gear trains faces the gear-position first gear train in an axial direction of the output shaft, and wherein the utility vehicle further comprises a second one-way clutch that transmits rotation only in the direction from the drive wheel toward the drive source and is disposed between a driven gear of the gear-position second gear train and the first gear member of the driven gear of the gear-position first gear train.

* * * * *